(12) United States Patent
Kitano et al.

(10) Patent No.: US 10,557,997 B2
(45) Date of Patent: Feb. 11, 2020

(54) LIGHT SOURCE DEVICE (71) Applicant: PANASONIC INTELLECTUAL PROPERTY MANAGEMENT CO., LTD., Osaka (JP)

(72) Inventors: Hiroshi Kitano, Hyogo (JP); Shintaro Hayashi, Hyogo (JP); Yoshiyuki Nakano, Osaka (JP); Hideharu Kawachi, Hyogo (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 188 days.

(21) Appl. No.: 15/454,404

(22) Filed: Mar. 9, 2017

(65) Prior Publication Data

US 2017/0261697 A1 Sep. 14, 2017

(30) Foreign Application Priority Data

Mar. 10, 2016 (JP) .................. 2016-047406

(51) Int. Cl.
*G02B 6/38* (2006.01)
*G02B 6/42* (2006.01)
*F21V 8/00* (2006.01)

(52) U.S. Cl.
CPC ......... *G02B 6/3874* (2013.01); *G02B 6/0006* (2013.01); *G02B 6/0008* (2013.01); *G02B 6/3849* (2013.01); *G02B 6/421* (2013.01); *G02B 6/4292* (2013.01); *G02B 6/3854* (2013.01)

(58) Field of Classification Search
CPC .. G02B 6/3874; G02B 6/0006; G02B 6/0008; G02B 6/3849; G02B 6/421; G02B 6/4292; G02B 6/3854
See application file for complete search history.

(56) References Cited

U.S. PATENT DOCUMENTS

| | | | | |
|---|---|---|---|---|
| 2002/0126356 A1* | 9/2002 | Nakanishi | ............ | G02B 6/4201 398/164 |
| 2003/0210866 A1* | 11/2003 | Kuhara | ................ | G02B 6/4246 385/49 |
| 2004/0042071 A1* | 3/2004 | Sato | ..................... | G02B 6/4246 359/355 |
| 2004/0258988 A1* | 12/2004 | Nielsen | .................... | H01G 9/10 429/181 |
| 2005/0259924 A1* | 11/2005 | Krahenbuhl | ......... | G02B 6/4204 385/88 |

(Continued)

FOREIGN PATENT DOCUMENTS

| | | |
|---|---|---|
| JP | 2013-149449 | 8/2013 |
| JP | 2014-232734 | 12/2014 |

*Primary Examiner* — Seahvosh Nikmanesh
(74) *Attorney, Agent, or Firm* — Greenblum & Bernstein, P.L.C.

(57) ABSTRACT

A light source device and a method of manufacturing a light source device are provided. The light source device includes a base. A light-emitter is above the base. A cap is joined to the base to cover the light-emitter. The cap includes an opening in a position corresponding to the light-emitter. A first light guide is in communication with the opening for guiding, to outside of the cap, light emitted by the light-emitter. A first ferrule is provided around the first light guide. The first ferrule is joined to an edge of the opening in a state in which the first ferrule is in the opening.

15 Claims, 6 Drawing Sheets

(56) References Cited

U.S. PATENT DOCUMENTS

| | | | |
|---|---|---|---|
| 2006/0133740 A1* | 6/2006 | Nakanishi | G02B 6/4206 385/88 |
| 2006/0152926 A1* | 7/2006 | Hama | A61B 1/0017 362/231 |
| 2008/0019642 A1* | 1/2008 | Kewitsch | G02B 6/3825 385/72 |
| 2009/0304337 A1* | 12/2009 | Sato | G02B 6/3807 385/92 |
| 2011/0280039 A1* | 11/2011 | Kishimoto | B60Q 1/0011 362/554 |
| 2012/0128299 A1* | 5/2012 | Engelberth | G02B 6/4296 385/28 |
| 2013/0182452 A1 | 7/2013 | Takahira et al. | |
| 2014/0336465 A1* | 11/2014 | Demers | A61B 1/07 600/176 |

* cited by examiner

|  | COMPOSITION 1 | COMPOSITION 2 | COMPOSITION 3 |
|---|---|---|---|
| FIRST LIGHT GUIDE ELEMENT 14a | QUARTZ GLASS (FIBER) | QUARTZ GLASS (FIBER) | METALIZED QUARTZ GLASS (FIBER) |
| JOINT MEMBER 20a | FIRST LOW-MELTING GLASS | SECOND LOW-MELTING GLASS | SOLDER |
| FIRST FERRULE 14b | ZIRCONIA | ZIRCONIA | Fe-BASED ALLOY (SUS) |
| JOINT MEMBER 20b | SECOND LOW-MELTING GLASS | N/A | SOLDER |
| CAP 12 | Fe-BASED ALLOY (SUS) | Fe-BASED ALLOY (SUS) | Fe-BASED ALLOY (SUS) |

LIGHT SOURCE DEVICE

CROSS REFERENCE TO RELATED APPLICATION

This application claims the benefit of priority of Japanese Patent Application Number 2016-047406 filed on Mar. 10, 2016, the entire content of which is hereby incorporated by reference.

BACKGROUND

1. Technical Field

The present disclosure relates to a light source device.

2. Description of the Related Art

Conventionally, a light source device is known in which a laser chip is included in, for example, a package formed of a can-shaped metal. (See, e.g., Patent Literature (PTL) 1 (Japanese Unexamined Patent Application Publication No. 2013-149449)) In a light source device disclosed by PTL 1, a laser chip is included in a package hermetically sealed. Laser light emitted by the laser chip is directly guided to the outside of the package by an optical rod extending from the inside to outside of the package. Moreover, the light guided by the optical rod is focused by an optical lens, and an irradiation object is irradiated with the light.

In recent years, fiber-optic communication through an optical fiber is getting popular, and there is a demand for a technique of guiding, to an optical fiber, laser light emitted by a laser chip in a package.

SUMMARY

With the conventional light source device described above, the laser light is directly guided from the inside of the hermetically sealed package by the optical rod, and is focused by the optical lens. For this reason, the laser chip, the optical rod, and the optical lens need to be aligned accurately. Furthermore, to accurately align the laser chip, the optical rod, and the optical lens, a precision and complex device structure is necessary. Accordingly, it has been difficult to further guide the laser light focused by the optical lens into the optical fiber which is thin and soft. In addition, there has been a problem that when, instead of the optical rod and the optical lens, the optical fiber is provided to extend from the inside to outside of the package to directly guide, into the optical fiber, the laser light emitted by the laser chip, the hermetic sealing of the package becomes insufficient.

In view of this, the present disclosure is aimed at providing a light source device which readily guides laser light into an optical fiber and is hermetically sealed.

A light source device according to one aspect of the present disclosure includes: a base; a light-emitter above the base; a cap joined to the base to cover the light-emitter, the cap including an opening in a position corresponding to the light-emitter; a first light guide in communication with the opening for guiding, to outside of the cap, light emitted by the light-emitter; and a first ferrule provided around the first light guide, wherein the first ferrule is joined to an edge of the opening in a state in which the first ferrule is in the opening.

The present disclosure provides a light source device which readily guides laser light into an optical fiber and is hermetically sealed.

BRIEF DESCRIPTION OF DRAWINGS

The figures depict one or more implementations in accordance with the present teaching, by way of examples only, not by way of limitations. In the figures, like reference numerals refer to the same or similar elements.

DETAILED DESCRIPTION OF THE EMBODIMENTS

In the following embodiments, a light source device will be described which readily guides laser light into an optical fiber and is hermetically sealed.

Hereinafter, embodiments of the present disclosure will be described with reference to the drawings. Note that the embodiments described below each show a specific example of the present disclosure. The numerical values, shapes, materials, structural components, the arrangement and connection of the structural components, steps, order of steps, etc. indicated in the following embodiments are mere examples, and are therefore not intended to limit the present disclosure. In addition, among the structural components in the following embodiments, those not recited in any of the independent claims defining the most generic part of the present disclosure are described as optional structural components.

Embodiment 1

Hereinafter, light source device 1 according to Embodiment 1 of the present disclosure will be described with reference to the drawings.

[1. Configuration of Light Source Device]

Figure 1:
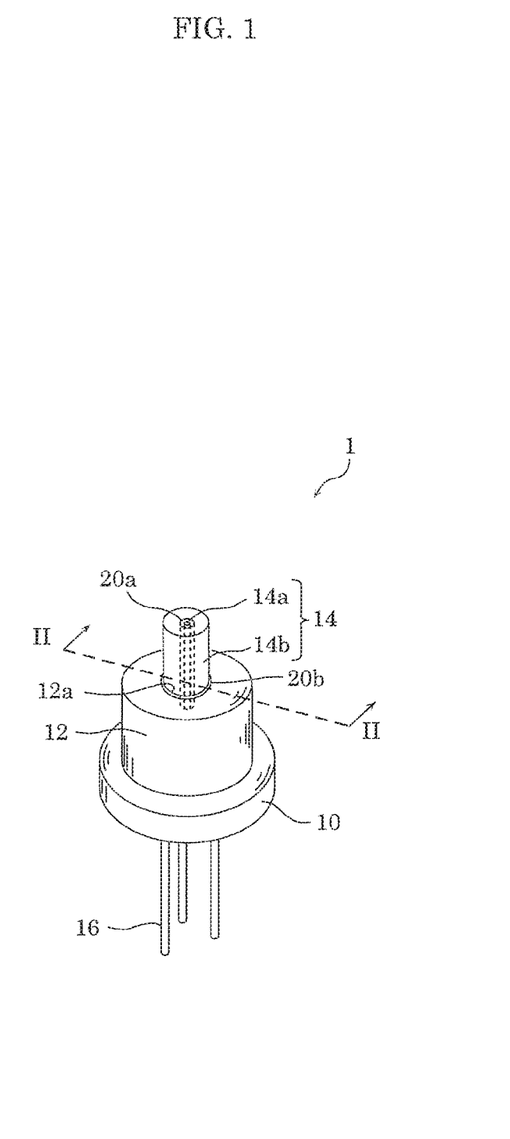
FIG. 1 is an external perspective view illustrating a configuration of a light source device according to Embodiment 1.
Figure 2:
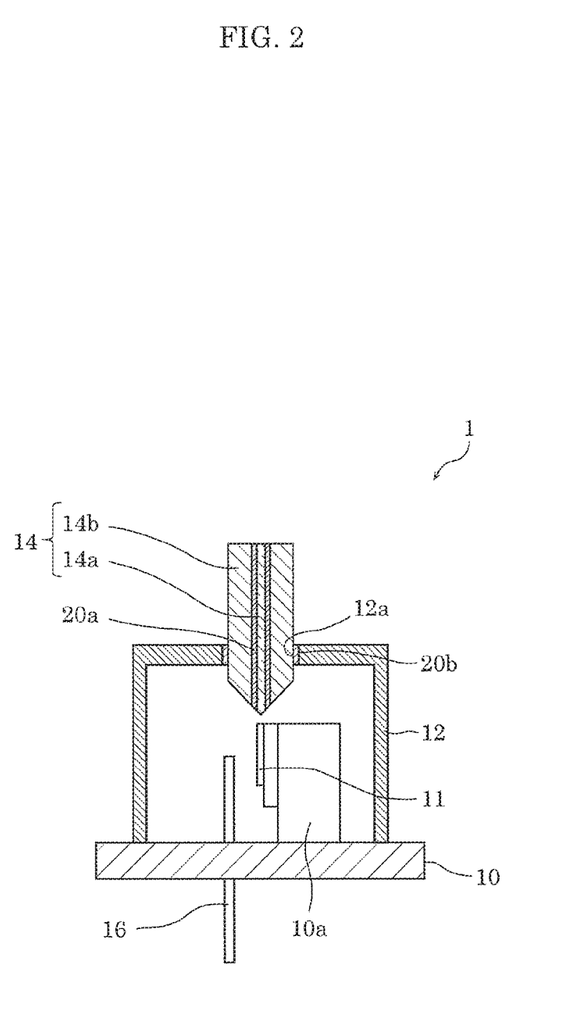
FIG. 2 is a cross-sectional view taken along line II-II of the light source device illustrated by FIG. 1.

First, a configuration of light source device 1 will be described. FIG. 1 is an external perspective view illustrating a configuration of light source device 1 according to Embodiment 1. FIG. 2 is a cross-sectional view taken along line II-II of the light source device illustrated by FIG. 1.

As illustrated by FIGS. 1 and 2, light source device 1 includes stem 10, light-emitter 11, cap 12, and first light guide portion 14.

Stem 10 is a base including, for example, metal. Stem 10 includes a Fe-based alloy (e.g., SUS or SF material), a Ni-based alloy (e.g., Kovar), or Cu-based alloy (e.g., brass) because these alloys each have superior heat conduction, weldability, plating property, a compatible coefficient of linear expansion with that of an object to be joined, etc. Moreover, a surface of stem 10 is plated. Examples of a plating material include Ni—Au plating. It is to be noted that stem 10 is an exemplary base in the present disclosure.

Light-emitter 11 is a semiconductor laser diode, for example. Light-emitter 11 is a semiconductor laser diode which emits short-wavelength light having a wavelength of at most 500 nm, for example. In a case where light-emitter 11 is the semiconductor laser diode which emits short-wavelength light, light source device 1 needs to be hermetically sealed so as to prevent a resonator of the semiconductor laser diode from being damaged. Light-emitter 11 is mounted on a block disposed on stem 10 so as to set an emission direction to be a predetermined direction. As will be described in detail later, light-emitter 11 according to Embodiment 1 is mounted so as to set the emission direction to be a direction of first light guide 14a of first light guide portion 14 disposed to opening 12a of cap 12.

Cap 12 is a metal cap joined to stem 10 so as to cover light-emitter 11 above stein 10. Cap 12 is joined to stem 10 by resistance welding (projection welding), for example. Cap 12 includes a metal such as the Fe-based alloy (e.g., SUS or SF material) and the Ni-based alloy (e.g., Boyar) because such a metal has precision cuttability, weldability, a compatible coefficient of linear expansion with that of an object to be joined, etc.

Moreover, cap 12 includes opening 12a in a surface facing stem 10 when joined to stem 10. First light guide portion 14 to be described later is disposed to opening 12a. With this, light source device 1 is hermetically sealed.

First light guide portion 14 includes first light guide 14a and first ferrule 14b. First ferrule 14b is provided around first light guide 14a.

First light guide 14a is an optical fiber including quartz glass or an optical fiber obtained by coating quartz glass with Ni and Au, for example. One end of first light guide 14a faces light-emitter 11, and a tip of the one end tapers off toward light-emitter 11. The tip of first light guide 14a is disposed at a position close to an emission opening (not illustrated) of light-emitter 11. Moreover, a direction of radiation of laser light emitted by light-emitter 11 substantially matches the longitudinal direction of first light guide 14a. With this, it is possible to readily guide, into first light guide 14a, the laser light emitted by light-emitter 11.

First ferrule 14b is provided to surround first light guide 14a. First ferrule 14b is joined to first light guide 14a by joint member 20a. First ferrule 14b is a cap to be placed to reinforce and protect first light guide 14a which is elongated, and includes a ceramic sintered body such as zirconia or a metal such as SUS, for example. Like the tip of first light guide 14a, a tip of first ferrule 14b facing light-emitter 11 tapers off toward light-emitter 11.

Moreover, first ferrule 14b is joined to the edge of opening 12a provided to cap 12, by joint member 20b. First ferrule 14b is joined to the edge of opening 12a of cap 12 by joint member 20b, which makes it possible to hermetically seal light source device 1 more accurately than in a case where joint member 20b is not used. It is to be noted that joint member 20a has a higher melting point than joint member 20b. Accordingly, after first light guide 14a and first ferrule 14b are joined by joint member 20a, it is possible to join first ferrule 14b and the edge of opening 12a of cap 12 by joint member 20b at a temperature lower than the melting point of joint member 20a. Thus, joining can be accurately performed because the joint member previously used for joining is not melted again in a subsequent process. It is to be noted that joint members 20a and 20b are an example of a second joint member and an example of a first joint member in the present disclosure, respectively.

Examples of joint members 20a and 20b include low-melting glass and solder because the low-melting glass and the solder each have a melting point, a compatible coefficient of linear expansion with that of an object to be joined, etc. The low melting point is a melting point of approximately at least 200° C. and at most 600° C.

Examples of joint members 20a and 20b having a melting point of at least 200° C. and at most 300° C. include lead glass. Although the lead glass poses an environmental issue, the lead glass is effective for light source device 1 according to Embodiment 1 because the lead glass has a low melting point. Moreover, examples of joint members 20a and 20b having a melting point of at least 300° C. and at most 400° C. include Ag glass. Although the Ag glass has a low melting point but is chemically unstable and has lower reliability, the Ag glass is effective for light source device 1 according to Embodiment 1 because the Ag glass has the low melting point. Furthermore, examples of joint members 20a and 20b having a melting point of at least 400° C. and at most 600° C. include a glass paste obtained by mixing glass powder and an organic binder. In a case where the glass paste is used, heating the glass paste causes the organic binder to volatilize and allows only glass components to remain. Two objects to be joined which have joint member 20a or joint member 20b in between can be joined by further cooling the glass components after the glass components are melted.

Lead terminal 16 is provided to stem 10. Lead terminal 16 is a terminal for supplying, from the outside of light source device 1, electric power for light-emitter 11 to emit light.

Figure 3:
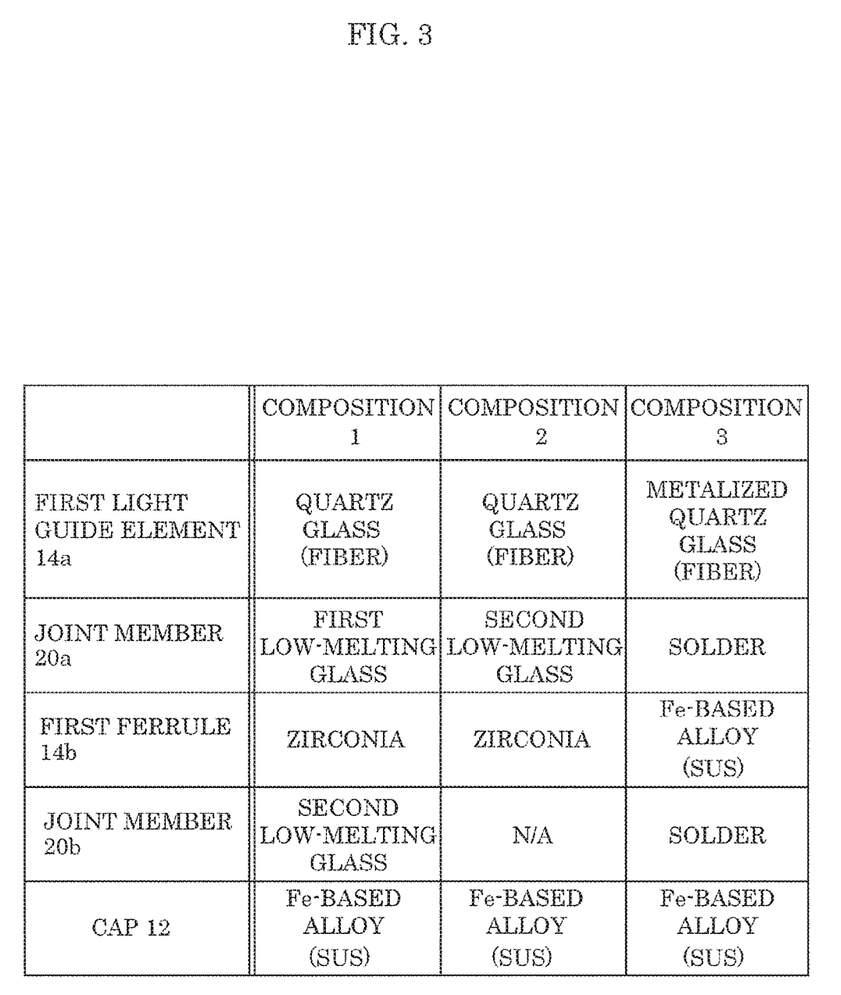
FIG. 3 is a table illustrating combinations of materials included in respective components of the light source device according to Embodiment 1.

FIG. 3 is a table illustrating combinations of materials included in respective components of light source device 1 according to Embodiment 1.

According to composition 1 illustrated by FIG. 3, first light guide 14a includes quartz glass, joint member 20a includes first low-melting glass, first ferrule 14b includes zirconia, joint member 20b includes second low-melting glass, and cap 12 includes the Fe:based alloy (SUS).

Here, the first low-melting glass included in joint member 20a has a higher melting point than the second low-melting glass included in joint member 20b. For example, the second low-melting glass may be Ag glass having a melting point of at least 300° C. and at most 400° C., and the first low-melting glass may be a glass paste having a melting point of at least 400° C. and at most 600° C. The glass paste is a paste obtained by mixing glass powder and an organic hinder, for example.

Moreover, according to composition 2, first light guide 14a includes the quartz glass, joint member 20a includes the second low-melting glass, first ferrule 14b includes zirconia, and cap 12 includes the Fe-based alloy (SUS).

It is to be noted that with this composition, light source device 1 is hermetically sealed not by using joint member 20b but by a compression method using a difference in thermal expansion between the metal included in cap 12 and the ceramic included in first ferrule 14b.

Furthermore, according to composition 3, first light guide 14a includes metalized quartz glass obtained by coating the quartz glass with Ni and Au, joint members 20a and 20b each include solder, first ferrule 14b includes the Fe-based alloy (SUS), and cap 12 includes the Fe-based alloy (SUS).

Here, the solder included in joint member 20a may have a higher melting point than the solder included in joint member 20b.

[2. Method for Manufacturing Light Source Device]

Figure 4:
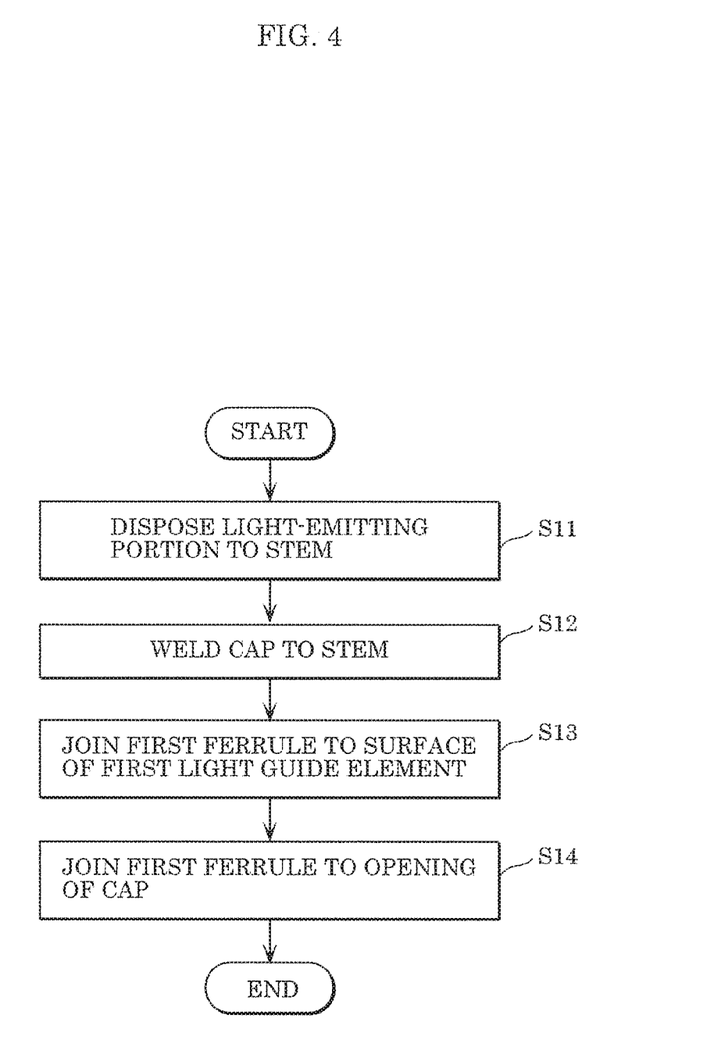
FIG. 4 is a flow chart illustrating an exemplary procedure for manufacturing the light source device according to Embodiment 1.

Next, a method for manufacturing light source device 1 will be described. FIG. 4 is a flow chart illustrating an exemplary procedure for manufacturing light source device 1 according to Embodiment 1. It is to be noted that an exemplary case will be described where aforementioned composition 1 is used in the following procedure for manufacturing light source device 1.

First, as illustrated by FIG. 4, light-emitter 11 is disposed to stem 10 (step S11). Block 10a for attaching light-emitter 11 is disposed on stem 10. Block 10a is disposed in a position where laser light emitted by light-emitter 11 attached to block 10a is guided into first light guide 14a. Subsequently, light-emitter 11 is disposed on block 10a. Here, light-emitter 11 is disposed so as to set an emission direction of the laser light emitted by light-emitter 11 to be a direction of first light guide 14a of first light guide portion 14 disposed to opening 12a of cap 12.

Next, cap 12 is welded to stem 10 (step S12). Stem 10 and cap 12 are welded together by resistance welding (projection welding). Passing an electric current through cap 12 produces Joule heat to melt the edge, on a side of stem 10, of cap 12. At the same time, cap 12 is pressed to stem 10. With this, cap 12 is connected to stem 10. It is to be noted that joining of stem 10 and cap 12 is not limited to the resistance welding, and other welding methods or connection methods other than welding may be used for the joining.

Next, first ferrule 14b is joined to the surface of first light guide 14a (step S13). Joint member 20a which joins first light guide 14a and first ferrule 14b is the aforementioned first low-melting glass, for example. The first low-melting glass is the glass paste having the melting point of at least 400° C. and at most 600° C. The glass paste obtained by mixing powder including glass components and the organic binder is applied to the surface of first light guide 14a. Subsequently, first light guide 14a is inserted into a through hole formed in first ferrule 14b. Here, the glass paste is filled between first light guide 14a and first ferrule 14b. After that, first light guide 14a and first ferrule 14b are heated. With this, the organic binder included in the glass paste is volatilized, and only the glass components remain. The remaining glass components are melted by the heating, and are solidified by being cooled after the melting. Here, first light guide 14a and first ferrule 14b are joined by the solidified glass.

Next, $N_2$ gas is filled inside cap 12 joined to stem 10. It is to be noted that gas filled inside cap 12 joined to stem 10 is not limited to the $N_2$ gas, and may be inert gas such as Ar gas.

Subsequently, first ferrule 14b is joined to the edge of opening 12a of cap 12 (step S14). Joint member 20b which joins the edge of opening 12a of cap 12 and first ferrule 14b is the aforementioned second low-melting glass, for example. The second low-melting glass is the Ag glass having the melting point of at least 300° C. and at most 400° C.

After the Ag glass is applied to the surface of first ferrule 14b, first ferrule 14b is inserted into opening 12a of cap 12. Here, an insertion depth of first ferrule 14b is adjusted so as to cause a tip of first ferrule 14b to face light-emitter 11. The Ag gas is filled between the edge of opening 12a of cap 12 and first ferrule 14b. The Ag glass is melted by being heated, and is solidified by further being cooled after the melting. Here, first ferrule 14b is joined to the edge of opening 12a of cap 12 by the solidified Ag glass.

Through the above procedure, light-emitter 11 can be sealed by stem 10, cap 12, and first ferrule 14b joined to the edge of opening 12a of cap 12, all of which are included in light source device 1.

It is to be noted that the process for joining first ferrule 14b to the surface of first light guide 14a (step S13) may be performed after the process for joining first ferrule 14b to the edge of opening 12a of cap 12 (step S14). In this case, joint member 20b which joins first ferrule 14b to the edge of opening 12a of cap 12 may have a higher melting point than joint member 20a which joins first light guide 14a and first ferrule 14b. In other words, a joining process in which one of joint member 20a and joint member 20b which has a higher melting point is used may be performed before a joining process in which one of joint member 20a and joint member 20b which has a lower melting point is used. The joining process in which the joint member having the higher melting point is used is performed before the joining process in which the joint member having the lower melting point is used. Accordingly, the joining process to be performed later can be performed at a lower junction temperature than the joining process to be performed earlier. Thus, joining can be accurately performed because the joint member previously used for joining is not melted again in a subsequent process.

Moreover, although joint members 20a and 20b are the glass paste and the Ag glass, respectively, in the aforementioned procedure for manufacturing, joint members 20a and 20b may include other materials. For example, joint member 20a may be the Ag glass, and joint member 20b may be the lead glass. Alternatively, joint member 20a may be the Ag glass, and joint member 20b may be a solder.

Moreover, first ferrule 14b and the edge of opening 12a of cap 12 may be joined not by joint member 20b but by the compression method using the difference in thermal expansion between the metal included in cap 12 and the ceramic included in first ferrule 14b.

Furthermore, for light source device 1 according to Embodiment 1, although first ferrule 14b is joined to the edge of opening 12a of cap 12 after cap 12 is welded to stem 10, cap 12 may be welded to stem 10 after first ferrule 14b is joined to the edge of opening 12a of cap 12.

[3. Advantageous Effects etc.]

As stated above, light source device 1 according to Embodiment 1 can be hermetically sealed by stem 10, cap 12, and first ferrule 14b joined to the edge of opening 12a of cap 12. In addition, first ferrule 14b is joined to the surface of first light guide 14a, and thus positions of first light guide 14a and light-emitter 11 can be matched highly accurately. With this, it is possible to readily guide, into first light guide 14a, the laser light emitted by light-emitter 11.

Moreover, first ferrule 14b may be joined to the edge of opening 12a by joint member 20b. First ferrule 14b is joined to the edge of opening 12a of cap 12 by joint member 20b, which makes it possible to hermetically seal light source device 1 more accurately than in a case where joint member 20b is not used.

Furthermore, first ferrule 14b may be jointed to first light guide 14a by joint member 20a having a higher melting point than joint member 20b. Accordingly, after first light guide 14a and first ferrule 14b are joined by joint member 20a, it is possible to join first ferrule 14b and the edge of opening 12a of cap 12 by joint member 20b at a temperature lower than the melting point of joint member 20a. Thus, joining can be accurately performed because joint member 20a is not melted again in a subsequent process.

Moreover, one end of first light guide 14a may face light-emitter 11, and a tip of the one end may taper off toward light-emitter 11. With this, it is possible to readily guide, into first light guide 14a, the laser light emitted by light-emitter 11.

Embodiment 2

Figure 5:
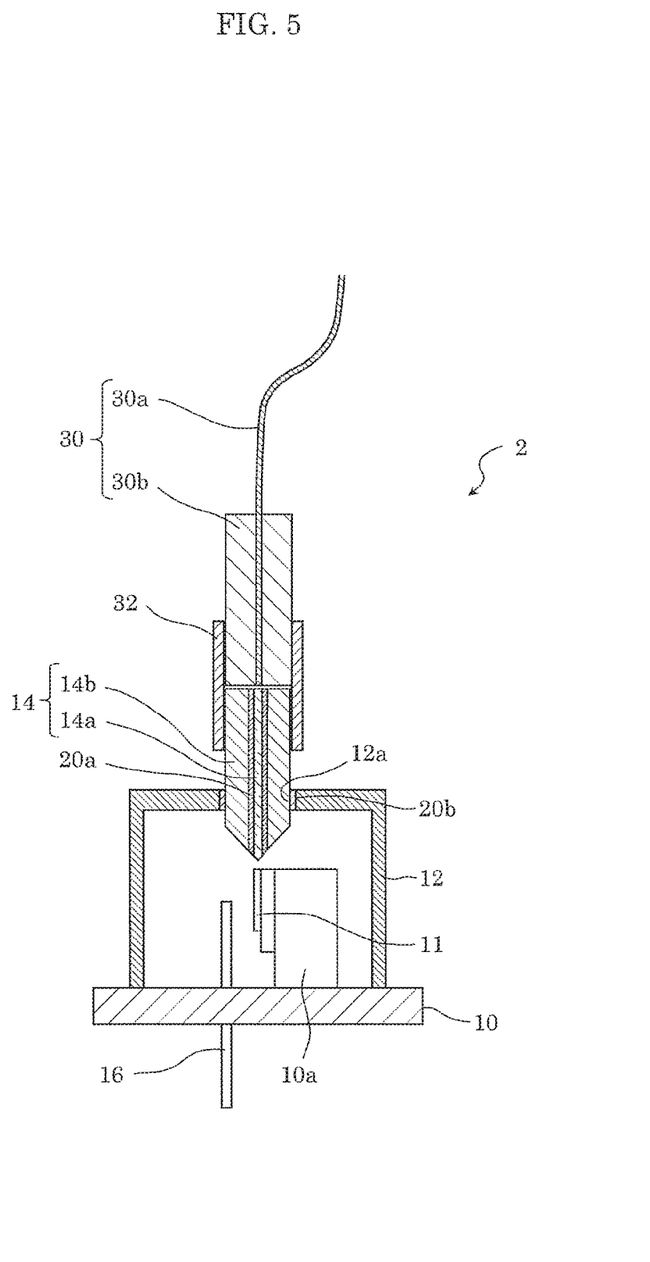
FIG. 5 is a cross-sectional view illustrating a configuration of a light source device according to Embodiment 2.
Figure 6:
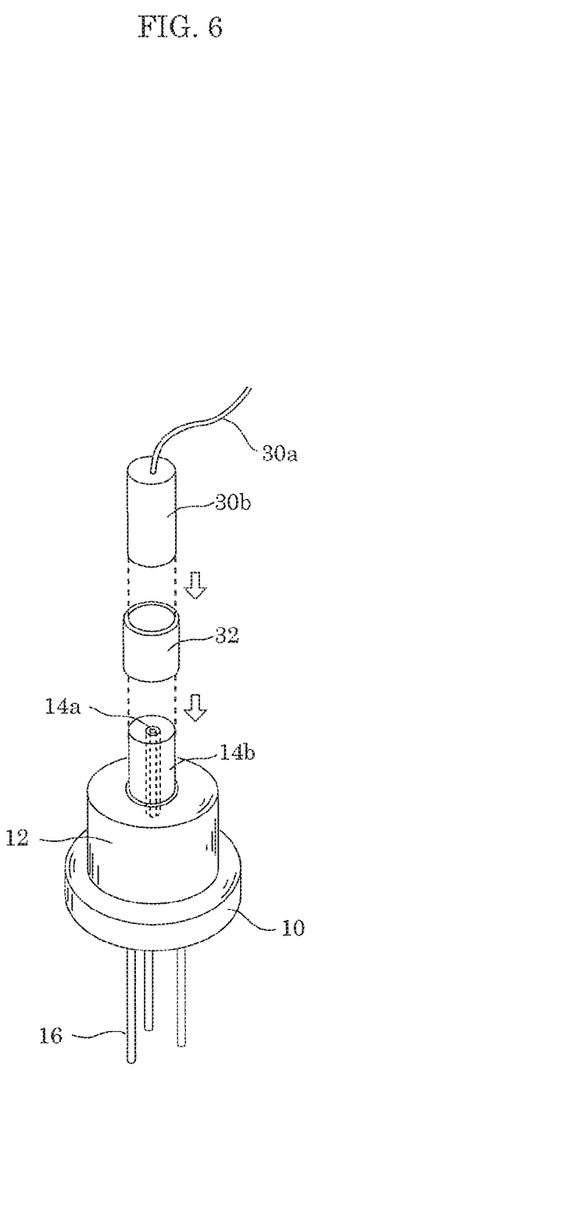
FIG. 6 is a schematic diagram illustrating exemplary usage of the light source device according to Embodiment 2.

Hereinafter, light source device 2 according to Embodiment 2 will be described. FIG. 5 is a cross-sectional view illustrating a configuration of light source device 2 according to Embodiment 2. FIG. 6 is a schematic diagram illustrating exemplary usage of light source device 2 according to Embodiment 2.

Light source device 2 according to Embodiment 2 differs from light source device 1 according to Embodiment 1 in including second light guide 30a which guides light which has exited from first light guide 14a. Second light guide 30a includes second ferrule 30b on a surface on an end portion side opposite first light guide 14a.

As illustrated by FIG. 5, light source device 2 includes stem 10, light-emitter 11, cap 12, first light guide portion 14, second light guide portion 30, and sleeve 32. Stem 10, light-emitter 11, cap 12, and first light guide portion 14 are the same as those included in light source device 1 according to Embodiment 1, and thus detailed description thereof is omitted.

As illustrated by FIG. 5, second light guide portion 30 includes second light guide 30a and second ferrule 30b.

Like first light guide 14a, second light guide 30a is an optical fiber including quartz glass or an optical fiber obtained by coating quartz glass with Ni and Au, for example.

Like first ferrule 14b, second ferrule 30b is a cap to be placed to reinforce and protect first light guide 14a which is elongated, and includes a ceramic sintered body such as zirconia or a metal such as SUS, for example. Second ferrule 30b is provided to the surface of second light guide 30a which is elongated, in an area ranging from a tip of second light guide 30a to a predetermined length.

Moreover, second ferrule 30b is detachably connected to first ferrule 14b by sleeve 32. More specifically, as illustrated by FIG. 6, one end of sleeve 32 is fitted onto first ferrule 14b, and second ferrule 30b is inserted into the other end of sleeve 32. With this, first light guide portion 14 and second light guide portion 30 are connected.

Sleeve 32 is a cylindrical connector for connecting first ferrule 14b and second ferrule 30b. Sleeve 32 has an inside diameter on one end side which is the same shape and size as the outside diameter of first ferrule 14b. In addition, sleeve 32 has an inside diameter on another end side which is the same shape and size as the outside diameter of second ferrule 30b.

Using sleeve 32 makes it easy to connect first ferrule 14b and second ferrule 30b. Thus, first light guide 14a and second light guide 30a can be connected with higher positional accuracy.

As stated above, light source device 2 according to the aforementioned embodiment may include second light guide 30a which guides the light which has exited from first light guide 14a, and second light guide 30a may include second ferrule 30b on a surface on an end portion side opposite first light guide 14a. With this, sleeve 32 makes it easy to connect second light guide portion 30 to first light guide portion 14. Thus, first light guide 14a and second light guide 30a can be connected with higher positional accuracy. Accordingly, it is possible to transmit via first light guide 14a and second light guide 30a the laser light emitted by light-emitter 11 to a distant place.

Moreover, second ferrule 30b may be detachably connected to first ferrule 14b by sleeve 32. Using sleeve 32 makes it easy to connect first ferrule 14b and second ferrule 30b. Thus, first light guide 14a and second light guide 30a can be connected with higher positional accuracy.

Although light source devices 1 and 2 according to the aforementioned embodiments of the present disclosure have been described above, the present disclosure is not limited to the embodiments.

For example, although joint member 20a has the higher melting point than joint member 20b in the aforementioned embodiment, joint member 20b may have a higher melting point than joint member 20a.

Moreover, although first ferrule 14b and the edge of opening 12a of cap 12 are joined by the first joint member in the aforementioned embodiment, first—ferrule 14b and the edge of opening 12a of cap 12 may be joined not by the first joint member but by the compression method using the difference in thermal expansion between the ceramic included in first ferrule 14b and the metal included in cap 12.

Furthermore, although first ferrule 14b is joined to the edge of opening 12a of cap 12 after cap 12 is welded to stem 10, cap 12 may be welded to stem 10 after first ferrule 14b is joined to the edge of opening 12a of cap 12.

Moreover, shapes, sizes, and materials of stem 10, first light guide 14a, first ferrule 14b, cap 12, joint member 20a, joint member 20b, second light guide 30a, second ferrule 30b, and sleeve 32 are not limited to those described above, and may be changed appropriately.

Furthermore, the method for manufacturing light source device 1 is not limited to include the aforementioned manufacturing processes, and may include other processes.

While the foregoing has described one or more embodiments and/or other examples, it is understood that various modifications may be made therein and that the subject matter disclosed herein may be implemented in various forms and examples, and that they may be applied in numerous applications, only some of which have been described herein. It is intended by the following claims to claim any and all modifications and variations that fall within the true scope of the present teachings.

The present disclosure can be applied to light-emitting devices, light source devices, automotive headlamps, etc.

What is claimed is:

1. A light source device, comprising:
   a base;
   a light-emitter above the base;
   a cap joined to the base to cover the light-emitter, the cap having an opening in a position corresponding to the light-emitter;
   a first light guide in communication with the opening for guiding, to outside of the cap, light emitted by the light-emitter; and
   a first ferrule surrounding the first light guide,
   wherein the first light guide and the first ferrule penetrate through the opening of the cap, and
   wherein the first ferrule is joined to an edge of the opening in a state in which the first ferrule is in the opening.

2. The light source device according to claim 1,
   wherein the first ferrule is joined to the edge of the opening by a first joint member.

3. The light source device according to claim 2,
   wherein the first ferrule is joined to the first light guide by a second joint member having a higher melting point than the first joint member.

4. The light source device according to claim 2,
   wherein the first ferrule is joined to the first light guide by a second joint member having a lower melting point than the first joint member.

5. The light source device according to claim 1, further comprising:
   a second light guide which further guides the light which is guided by the first light guide; and
   a second ferrule provided around the second light guide, wherein the second ferrule is on an end of the first ferrule opposite the first light guide.

6. The light source device according to claim 5,
   wherein the second ferrule is detachably connected to the first ferrule by a sleeve.

7. The light source device according to claim 1,
wherein one end of the first light guide faces the light-emitter, and a tip of the one end tapers toward the light-emitter.

8. The light source device according to claim 7,
wherein one end of the first ferrule faces the light-emitter, and a tip of the one end tapers toward the light-emitter.

9. The light source device according to claim 1,
wherein the light-emitter is hermetically sealed.

10. The light source device according to claim 1,
wherein the light-emitter is a semiconductor laser diode.

11. The light source device according to claim 10,
wherein the semiconductor laser diode emits short-wavelength light having a wavelength of at most 500 nm.

12. The light source device according to claim 1,
wherein the base and the cap comprise a same material for having a compatible coefficient of linear expansion.

13. The light source device according to claim 12,
wherein the cap is joined to the base by resistance welding.

14. The light source device according to claim 1,
wherein the first light guide and the first ferrule extend through the opening and into an enclosed space defined by the cap and the base.

15. The light source device according to claim 1, further comprising: the first ferrule having a body portion that accommodates the first light guide therein, and wherein the body portion of the ferrule penetrates the opening.

* * * * *